(12) United States Patent
Kobayashi et al.

(10) Patent No.: US 11,507,110 B2
(45) Date of Patent: Nov. 22, 2022

(54) VEHICLE REMOTE ASSISTANCE SYSTEM, VEHICLE REMOTE ASSISTANCE SERVER, AND VEHICLE REMOTE ASSISTANCE METHOD

(71) Applicant: TOYOTA JIDOSHA KABUSHIKI KAISHA, Toyota (JP)

(72) Inventors: Hiromitsu Kobayashi, Nisshin (JP); Hiromitsu Urano, Numazu (JP); Sho Otaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/370,582

(22) Filed: Jul. 8, 2021

(65) Prior Publication Data
US 2022/0113737 A1  Apr. 14, 2022

(30) Foreign Application Priority Data

Oct. 12, 2020 (JP) .............................. JP2020-171758

(51) Int. Cl.
*G05D 1/02* (2020.01)
*B60W 60/00* (2020.01)

(52) U.S. Cl.
CPC ......... *G05D 1/0276* (2013.01); *B60W 60/001* (2020.02); *G05D 1/0214* (2013.01); *B60W 2556/45* (2020.02)

(58) Field of Classification Search
CPC ............... G05D 1/0276; G05D 1/0214; G05D 2201/0213; G05D 1/0011; B60W 60/001; B60W 2556/45; G06F 16/53
See application file for complete search history.

(56) References Cited

U.S. PATENT DOCUMENTS

2018/0136651 A1    5/2018  Levinson et al.
2020/0219070 A1*   7/2020  Rosenzweig .......... G07C 5/085

FOREIGN PATENT DOCUMENTS

| JP | 2018-077649 A | 5/2018 |
| JP | 2019-021200 A | 2/2019 |
| JP | 2019-207539 A | 12/2019 |
| WO | 2018/232032 A1 | 12/2018 |

* cited by examiner

*Primary Examiner* — Rodney A Butler
(74) *Attorney, Agent, or Firm* — Sughrue Mion, PLLC

(57) ABSTRACT

A vehicle remote assistance system including: a remote assistance example database in which a past assistance request situation and a remote assistance content made by a remote operator are stored in association with each other, and a server. The server is configured to, upon receipt of a remote assistance request from an autonomous vehicle, determine whether or not a remote assistance request situation of the autonomous vehicle is similar to the past assistance request situation stored in the remote assistance example database, based on a position of the autonomous vehicle transmitting the remote assistance request and an external environment around the autonomous vehicle; and the server is configured to, when the server determines that the remote assistance request situation is similar to the past assistance request situation, transmit the remote assistance content corresponding to the past assistance request situation to the autonomous vehicle in substitution for the remote operator.

8 Claims, 6 Drawing Sheets

VEHICLE REMOTE ASSISTANCE SYSTEM, VEHICLE REMOTE ASSISTANCE SERVER, AND VEHICLE REMOTE ASSISTANCE METHOD

CROSS-REFERENCE TO RELATED APPLICATION

This application claims priority to Japanese Patent Application No. 2020-171758 filed on Oct. 12, 2020, incorporated herein by reference in its entirety.

BACKGROUND

1. Technical Field

The present disclosure relates to a vehicle remote assistance system, a vehicle remote assistance server, and a vehicle remote assistance method.

2. Description of Related Art

In the related art, Japanese Unexamined Patent Application Publication No. 2018-077649 (JP 2018-077649 A) is known as a technical literature related to a vehicle remote assistance system. This publication describes a system configured such that, upon receipt of a remote assistance request from a vehicle, a situation of the vehicle is presented to a remote operator, and remote operation by the remote operator is reflected on traveling of the vehicle. The remote operation indicates that driving operation is remotely performed on the vehicle by operating a steering wheel and so on provided in a facility outside the vehicle.

SUMMARY

In the meantime, the following vehicle remote assistance system has been examined. That is, in the vehicle remote assistance system, a determination on traveling of an autonomous vehicle is remotely assisted without reflecting minute steering operation or the like by a remote operator on the vehicle in real time like the above system in the related art. The vehicle remote assistance system supports making a determination on traveling of the autonomous vehicle in such a scene where the autonomous vehicle should pass a broken-down vehicle stopping out of a shoulder in a narrow road, for example.

However, in some cases, e.g., in a case where a plurality of autonomous vehicles targeted for remote assistance travels on the same lane, there is such a problem that it is not efficient to repeat the same support frequently, and a workload of the remote operator increases.

One aspect of the present disclosure is to provide a vehicle remote assistance system in which a remote operator performs remote assistance on traveling of an autonomous vehicle upon receipt of a remote assistance request from the autonomous vehicle. The vehicle remote assistance system includes a remote assistance example database and a server. In the remote assistance example database, a past assistance request situation and a remote assistance content are stored in association with each other. The past assistance request situation includes vehicle positional information and external environment information at the time when the remote assistance request has been made previously. The remote assistance content is made by the remote operator in the past assistance request situation. The server is configured to, upon receipt of the remote assistance request from the autonomous vehicle, determine whether or not a remote assistance request situation of the autonomous vehicle is similar to the past assistance request situation stored in the remote assistance example database, based on a position of the autonomous vehicle transmitting the remote assistance request and an external environment around the autonomous vehicle. The server is configured to, when the server determines that the remote assistance request situation is similar to the past assistance request situation, transmit the remote assistance content corresponding to the past assistance request situation to the autonomous vehicle in substitution for the remote operator.

In the vehicle remote assistance system according to one aspect of the present disclosure, when a remote assistance request situation of the autonomous vehicle making a remote assistance request is determined to be similar to a past assistance request situation stored in the remote assistance example database, a remote assistance content corresponding to the past assistance request situation is transmitted to the autonomous vehicle in substitution for the remote operator. Accordingly, it is possible to reduce the frequency of remote assistance performed by the remote operator, thereby making it possible to reduce a workload of the remote operator.

In the vehicle remote assistance system according to one aspect of the present disclosure, the server may be configured to, when the remote operator performs the remote assistance on the autonomous vehicle, cause the remote operator to make a selection of whether the remote assistance request situation of the autonomous vehicle has continuity or not. The past assistance request situation may be stored in the remote assistance example database in association with a result of the selection made by the remote operator in the continuity selection portion. When the remote assistance request situation of the autonomous vehicle is determined to be similar to the past assistance request situation determined to have continuity as the result of the selection, the server may transmit, to the autonomous vehicle, the remote assistance content corresponding to the past assistance request situation. When the remote assistance request situation of the autonomous vehicle is determined to be similar to the past assistance request situation determined not to have continuity as the result of the selection, the server may not transmit, to the autonomous vehicle, the remote assistance content corresponding to the past assistance request situation.

In the vehicle remote assistance system, the remote operator is caused to make a selection of whether the remote assistance request situation of the autonomous vehicle has continuity or not. When the remote assistance request situation of the autonomous vehicle is determined to be similar to a past assistance request situation (e.g., a situation where a bicycle falls down on a zebra zone) determined not to have continuity as a result of the selection, a remote assistance content corresponding to the past assistance request situation is not transmitted to the autonomous vehicle. Accordingly, it is possible to avoid wrongly transmitting, to the autonomous vehicle, a remote assistance content corresponding to a past assist request situation which does not have continuity and which is highly likely to change.

In the vehicle remote assistance system according to one aspect of the present disclosure, the remote assistance request situation may be a situation of lane deviation avoidance from an obstacle ahead of the autonomous vehicle.

In this vehicle remote assistance system, in a situation to perform lane deviation avoidance to avoid an obstacle (e.g., a vehicle parking over a traveling path, a fallen object, or the like) by deviating from a lane to take a distance from the obstacle, it is possible to reduce the frequency of remote assistance performed by the remote operator, thereby making it possible to reduce a workload of the remote operator.

Another aspect of the present disclosure is to provide a vehicle remote assistance server for a remote operator to perform remote assistance on traveling of an autonomous vehicle upon receipt of a remote assistance request from the autonomous vehicle. The vehicle remote assistance server includes a similarity determination portion and a remote assistance content auto transmission portion. The similarity determination portion is configured to, upon receipt of the remote assistance request from the autonomous vehicle, determine whether or not a remote assistance request situation of the autonomous vehicle is similar to a past assistance request situation, based on a position of the autonomous vehicle transmitting the remote assistance request and an external environment around the autonomous vehicle. The past assistance request situation includes vehicle positional information and external environment information at a time when the remote assistance request has been made previously. The remote assistance content auto transmission portion is configured to, when the similarity determination portion determines that the remote assistance request situation is similar to the past assistance request situation, transmit a remote assistance content corresponding to the past assistance request situation to the autonomous vehicle in substitution for the remote operator, by referring to a remote assistance example database in which the past assistance request situation and the remote assistance content are stored in association with each other. The remote assistance content is made by the remote operator in the past assistance request situation.

In the vehicle remote assistance server according to another aspect of the present disclosure, when a remote assistance request situation of the autonomous vehicle making a remote assistance request is determined to be similar to a past assistance request situation stored in the remote assistance example database, a remote assistance content corresponding to the past assistance request situation is transmitted to the autonomous vehicle in substitution for the remote operator. Accordingly, it is possible to reduce the frequency of remote assistance performed by the remote operator, thereby making it possible to reduce a workload of the remote operator.

Further another aspect of the present disclosure is to provide a vehicle remote assistance method for a vehicle remote assistance system in which a remote operator performs remote assistance on traveling of an autonomous vehicle upon receipt of a remote assistance request from the autonomous vehicle. The vehicle remote assistance method includes, upon receipt of the remote assistance request from the autonomous vehicle, determining whether or not a remote assistance request situation of the autonomous vehicle is similar to a past assistance request situation, based on a position of the autonomous vehicle transmitting the remote assistance request and an external environment around the autonomous vehicle, the past assistance request situation including vehicle positional information and external environment information at the time when the remote assistance request has been made previously; and the method includes, when the remote assistance request situation is determined to be similar to the past assistance request situation, transmitting a remote assistance content corresponding to the past assistance request situation to the autonomous vehicle in substitution for the remote operator, by referring to a remote assistance example database in which the past assistance request situation and the remote assistance content are stored in association with each other. The remote assistance content is made by the remote operator in the past assistance request situation.

In the vehicle remote assistance method according to further another aspect of the present disclosure, when a remote assistance request situation of the autonomous vehicle making a remote assistance request is determined to be similar to a past assistance request situation stored in the remote assistance example database, a remote assistance content corresponding to the past assistance request situation is transmitted to the autonomous vehicle in substitution for the remote operator. Accordingly, it is possible to reduce the frequency of remote assistance performed by the remote operator, thereby making it possible to reduce a workload of the remote operator.

With each of the aspects of the present disclosure, it is possible to reduce the frequency of remote assistance performed by the remote operator, thereby making it possible to reduce a workload of the remote operator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings.

Figure 1:
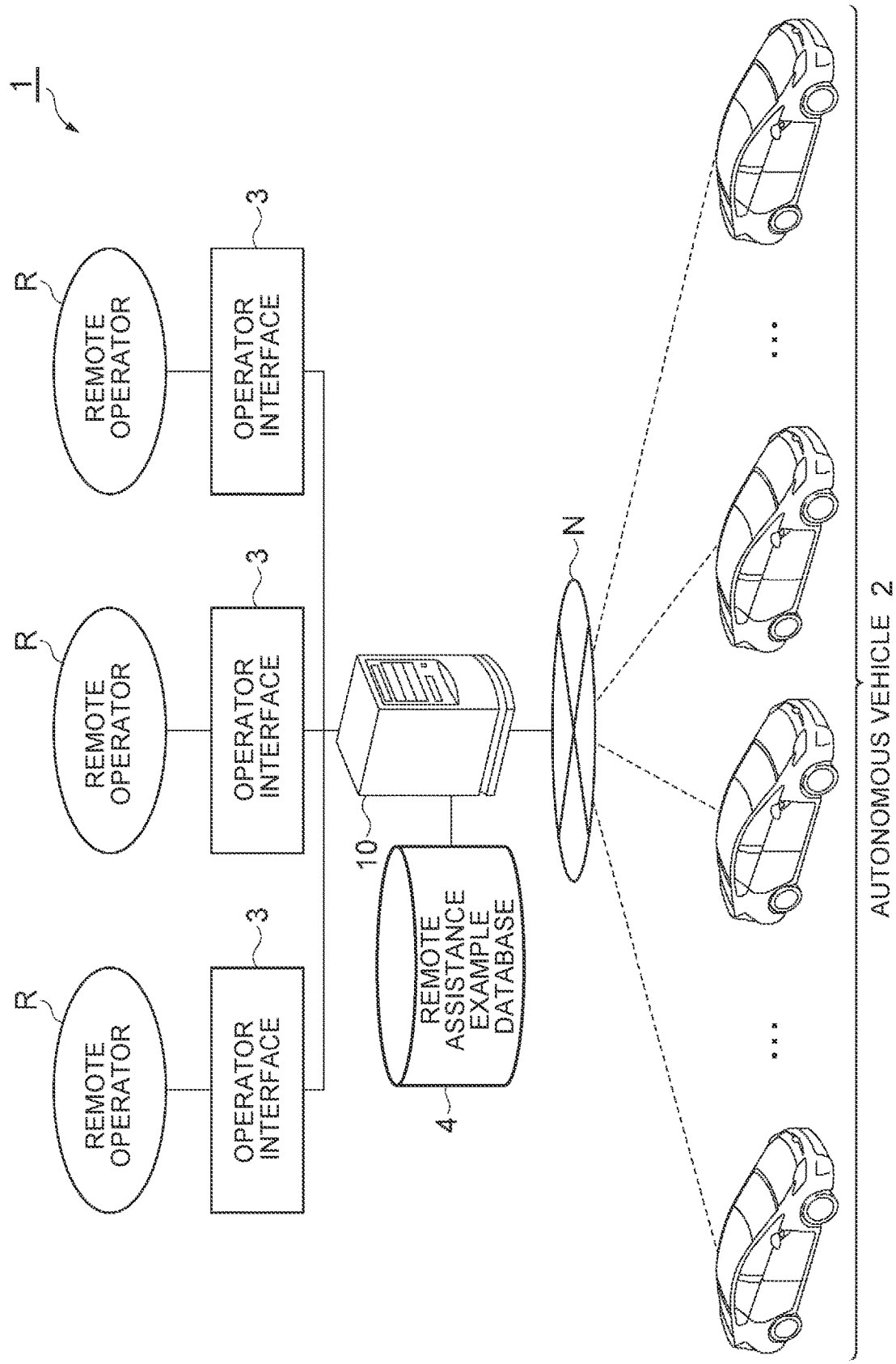
FIG. 1 is a view to describe a vehicle remote assistance system according to one embodiment.

FIG. 1 is a view to describe a vehicle remote assistance system according to one embodiment. The vehicle remote assistance system 1 illustrated in FIG. 1 is a system in which a remote operator R performs remote assistance on an autonomous vehicle 2 in response to a remote assistance request from the autonomous vehicle 2. The remote operator R is a person who performs remote assistance on the autonomous vehicle 2.

The number of remote operators R is not limited and may be one or may be two or more. The number of autonomous vehicles 2 communicable with the vehicle remote assistance system 1 is not limited in particular. A plurality of remote operators R may perform remote assistance on one autonomous vehicle 2 by turns, or one remote operator R may perform remote assistance on two or more autonomous vehicles 2.

The remote assistance is notification (transmission) of a suggestion from the remote operator R about traveling of the autonomous vehicle 2. The remote assistance includes a suggestion of advance or stop of the autonomous vehicle 2, for example. The remote assistance may include a suggestion of acceleration or deceleration of the autonomous vehicle 2. The remote assistance may include a suggestion of route change of the autonomous vehicle 2.

More specifically, the remote assistance can include at least one of the following suggestions: a suggestion of lane deviation avoidance from an obstacle ahead of the autonomous vehicle; a suggestion of advance or stop at the time of a failure of a traffic light; a suggestion of vehicle behavior at the time of poor recognition of a road sign (e.g., a suggestion of temporary stop or a suggestion of speed specification); a suggestion of route change when a road becomes impassable due to a fallen tree or damage on the road; a suggestion to pass a preceding vehicle (including a parked vehicle); a suggestion of lane change; a suggestion of start of right turn at an intersection; a suggestion of entry start at an intersection with a traffic light; and a suggestion of urgent evacuation.

The lane deviation avoidance indicates an avoidance method in which a vehicle advances with a distance from an obstacle by deviating from a lane in order to avoid the obstacle. The obstacle is a vehicle parking over a traveling path, a fallen object, a partial depression of the road, or the like. In countries or arears where drivers keep to the right side of the road, a suggestion of start of left turn at an intersection can be notified instead of the notification of a suggestion of start of right turn at an intersection.

Note that the autonomous vehicle 2 may not necessarily follow a remote assistance content from the remote operator R. Even in a case where the autonomous vehicle 2 receives a suggestion of advance of the autonomous vehicle 2 as the remote assistance content, when the autonomous vehicle 2 detects sudden approach of a pedestrian, or the like, the autonomous vehicle 2 may stop preferentially.

In the vehicle remote assistance system 1, the remote operator R is requested to input remote assistance in response to a remote assistance request from the autonomous vehicle 2, for example. The remote operator R inputs a remote assistance content into an operator interface 3. The vehicle remote assistance system 1 transmits the remote assistance content to the autonomous vehicle 2 through a network N. The autonomous vehicle 2 travels automatically in accordance with the remote assistance.

Configuration of Autonomous Vehicle

Figure 2:
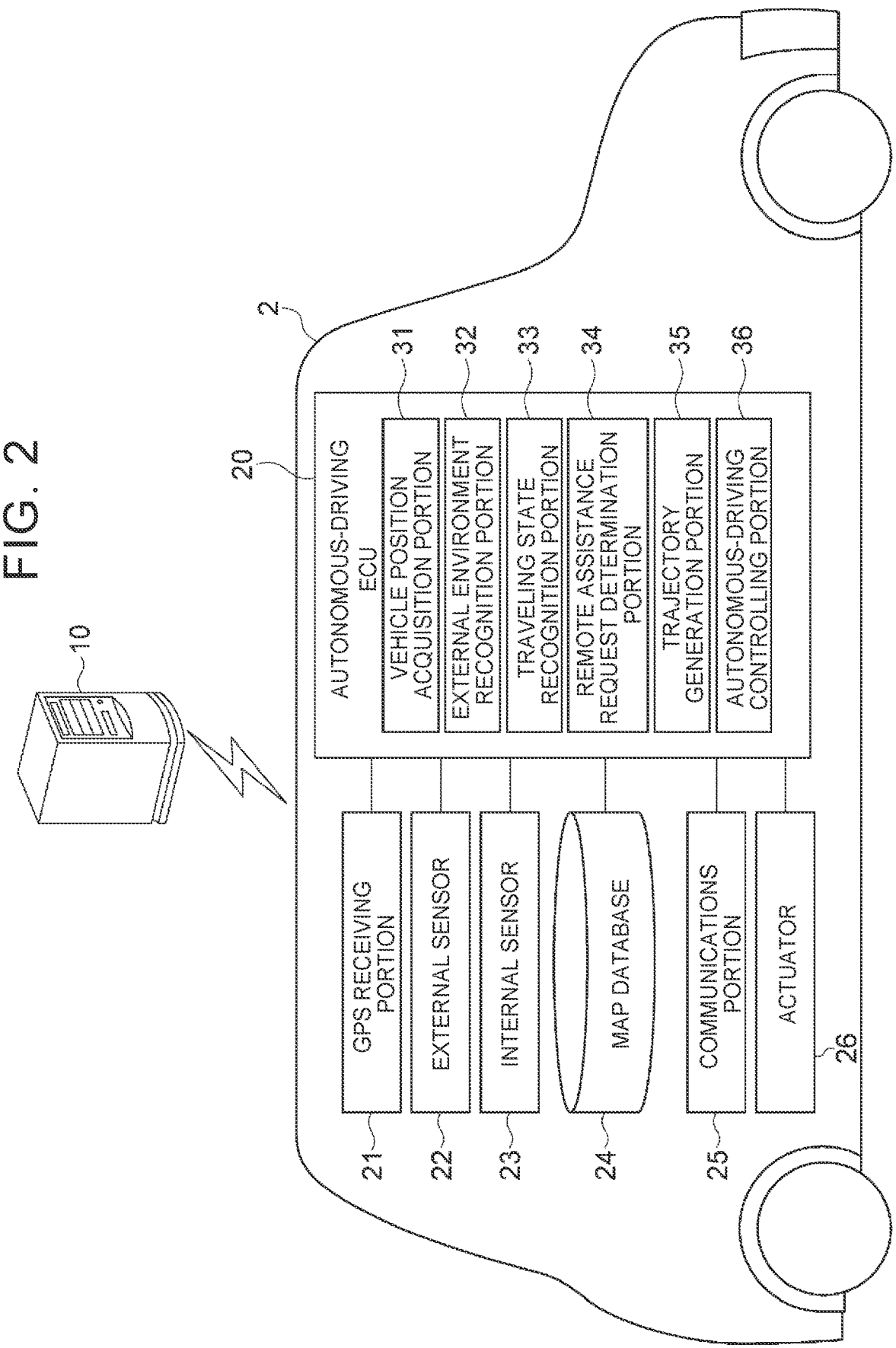
FIG. 2 is a block diagram illustrating an exemplary configuration of an autonomous vehicle.

First described is an exemplary configuration of the autonomous vehicle 2. FIG. 2 is a block diagram illustrating the exemplary configuration of the autonomous vehicle 2. As illustrated in FIG. 2, the autonomous vehicle 2 includes an autonomous-driving ECU 20 as an example. The autonomous-driving ECU 20 is an electronic control unit including a central processing unit (CPU), a read only memory (ROM), a random access memory (RAM), and so on. The autonomous-driving ECU 20 implements various functions by executing programs stored in the ROM or the RAM by the CPU, for example. The autonomous-driving ECU 20 may be constituted by a plurality of electronic control units.

The autonomous-driving ECU 20 is connected to a global positioning system (GPS) receiving portion 21, an external sensor 22, an internal sensor 23, a map database 24, a communications portion 25, and an actuator 26.

The GPS receiving portion 21 measures a position of the autonomous vehicle 2 (e.g., latitude and longitude of the autonomous vehicle 2) by receiving signals from three or more GPS satellites. The GPS receiving portion 21 transmits measured positional information on the autonomous vehicle 2 to the autonomous-driving ECU 20.

The external sensor 22 is an in-vehicle sensor configured to detect an external environment around the autonomous vehicle 2. The external sensor 22 includes at least a camera. The camera is an imaging device configured to capture an image of the external environment around the autonomous vehicle 2. The camera is provided on the back side of a windshield of the autonomous vehicle 2, for example, and captures an image ahead of the autonomous vehicle 2. The camera transmits captured image information on the external environment around the autonomous vehicle 2 to the autonomous-driving ECU 20. The camera may be a monocular camera or may be a stereoscopic camera. A plurality of cameras may be provided, so that the cameras capture images on the right and left lateral sides from the autonomous vehicle 2 and behind the autonomous vehicle 2 in addition to the image ahead of the autonomous vehicle 2. An external camera for the remote operator may be provided in the autonomous vehicle 2. The external camera for the remote operator captures at least an image ahead of the autonomous vehicle 2. The external camera for the remote operator may be constituted by a plurality of cameras configured to capture images of surrounding areas including areas on the lateral sides from and behind the autonomous vehicle 2.

The external sensor 22 may include a radar sensor. The radar sensor is a detection instrument configured to detect an object around the autonomous vehicle 2 by use of radio waves (e.g., millimeter waves) or light. For example, the radar sensor includes a millimeter wave radar or a light detection and ranging sensor (LIDAR). The radar sensor transmits radio waves or light to an area around the autonomous vehicle 2 and detects an object by receiving radio waves or light reflected from the object. The radar sensor transmits detected object information to the autonomous-driving ECU 20. The object includes a moving object such as a pedestrian, a bicycle, or another vehicle, other than a fixed object such as a guard rail or a building. Further, the external sensor 22 may include a sound detection sensor configured to detect sound outside the autonomous vehicle 2.

The internal sensor 23 is an in-vehicle sensor configured to detect a traveling state of the autonomous vehicle 2. The internal sensor 23 includes a vehicle speed sensor, an acceleration sensor, and a yaw rate sensor. The vehicle speed sensor is a detector configured to detect the speed of the autonomous vehicle 2. As the vehicle speed sensor, a wheel speed sensor provided for a wheel of the autonomous vehicle 2, a drive shaft rotating integrally with the wheel, or the like so as to detect the rotation speed of each wheel can be used. The vehicle speed sensor transmits detected vehicle speed information (wheel speed information) to the autonomous-driving ECU 20.

The acceleration sensor is a detector configured to detect the acceleration of the autonomous vehicle 2. The acceleration sensor includes a front-rear acceleration sensor configured to detect the acceleration of the autonomous vehicle 2 in the front-rear direction, for example. The acceleration sensor may include a lateral acceleration sensor configured to detect a lateral acceleration of the autonomous vehicle 2.

The acceleration sensor transmits acceleration information on the autonomous vehicle 2 to the autonomous-driving ECU 20, for example. The yaw rate sensor is a detector configured to detect a yaw rate (rotation angular velocity) around the vertical axis of the gravitational center of the autonomous vehicle 2. As the yaw rate sensor, a gyro sensor can be used, for example. The yaw rate sensor transmits detected yaw rate information on the autonomous vehicle 2 to the autonomous-driving ECU 20.

The map database 24 is a database in which map information is stored. The map database 24 is formed in a storage device such as an HDD provided in the autonomous vehicle 2, for example. The map information includes positional information on roads, information on road shapes (e.g., curvature information), positional information on intersections and branch points, and so on. The map information may also include traffic rule information such as regulation speeds associated with positional information. The map information may also include target information to be used for acquisition of positional information on the autonomous vehicle 2. As targets, road signs, road marking, traffic lights, telephone poles, and so on can be used. The map database 24 may be formed in a server communicable with the autonomous vehicle 2. The server is not limited to a vehicle remote assistance server 10.

The communications portion 25 is a communications device configured to control wireless communication with external devices provided outside the autonomous vehicle 2. The communications portion 25 performs transmission and reception of various pieces of information to and from the vehicle remote assistance server 10 via the network N.

The actuator 26 is a device used to control the autonomous vehicle 2. The actuator 26 includes at least a drive actuator, a brake actuator, and a steering actuator. The drive actuator controls an air supply amount (a throttle opening degree) to an engine in accordance with a control signal from the autonomous-driving ECU 20 and controls driving force of the autonomous vehicle 2. Note that, in a case where the autonomous vehicle 2 is a hybrid vehicle, the driving force is controlled such that the control signal from the autonomous-driving ECU 20 is input into a motor as a power source, in addition to the control on the air supply amount to the engine. In a case where the autonomous vehicle 2 is an electric vehicle, the driving force is controlled such that the control signal from the autonomous-driving ECU 20 is input into a motor as a power source. The motors as the power sources in those cases constitute the actuator 26.

The brake actuator controls a brake system in accordance with a control signal from the autonomous-driving ECU 20 and controls braking force to be applied to the wheels of the autonomous vehicle 2. As the braking system, it is possible to use a hydraulic brake system, for example. The steering actuator controls driving of an assist motor in accordance with a control signal from the autonomous-driving ECU 20. The assist motor is configured to control a steering torque in an electric power steering system. Hereby, the steering actuator controls the steering torque of the autonomous vehicle 2.

Descriptions are now made of an exemplary functional configuration of the autonomous-driving ECU 20. The autonomous-driving ECU 20 includes a vehicle position acquisition portion 31, an external environment recognition portion 32, a traveling state recognition portion 33, a remote assistance request determination portion 34, a trajectory generation portion 35, and an autonomous-driving controlling portion 36.

The vehicle position acquisition portion 31 acquires vehicle positional information on the autonomous vehicle 2 based on positional information from the GPS receiving portion 21 and the map information in the map database 24. Further, the vehicle position acquisition portion 31 may acquire the vehicle positional information on the autonomous vehicle 2 by a simultaneous localization and mapping (SLAM) technology by use of target information included in the map information in the map database 24 and a detection result from the external sensor 22. The vehicle position acquisition portion 31 may recognize a lateral position of the autonomous vehicle 2 relative to a lane (a position of the autonomous vehicle 2 in a lane-width direction) from a vehicle positional relationship between a division line of the lane and the autonomous vehicle 2 and may include the lateral position in the vehicle positional information. The vehicle position acquisition portion 31 may acquire the vehicle positional information on the autonomous vehicle 2 by others well-known techniques.

The external environment recognition portion 32 recognizes an external environment around the autonomous vehicle 2 based on a detection result from the external sensor 22. The external environment includes a relative position of a surrounding object relative to the autonomous vehicle 2. External environment information may include a relative speed of the surrounding object relative to the autonomous vehicle 2 and a moving direction of the surrounding object. The external environment information may include a type of the object such as another vehicle, a pedestrian, or a bicycle. The type of the object can be identified by a well-known method such as pattern matching. The external environment information may also include a result of division line recognition (white line recognition) around the autonomous vehicle 2. The external environment information may also include a recognition result of a lighting state of a traffic light. The external environment recognition portion 32 can recognize a lighting state of a traffic light ahead of the autonomous vehicle 2 (a lighting state where the autonomous vehicle 2 can go, a lighting state where the autonomous vehicle 2 should stop, and so on) based on an image captured by the camera of the external sensor 22, for example.

The traveling state recognition portion 33 recognizes a traveling state of the autonomous vehicle 2 based on a detection result from the internal sensor 23. The traveling state includes the vehicle speed of the autonomous vehicle 2, the acceleration of the autonomous vehicle 2, and the yaw rate of the autonomous vehicle 2. More specifically, the traveling state recognition portion 33 recognizes the vehicle speed of the autonomous vehicle 2 based on vehicle speed information from the vehicle speed sensor. The traveling state recognition portion 33 recognizes the acceleration of the autonomous vehicle 2 based on acceleration information from the acceleration sensor. The traveling state recognition portion 33 recognizes a direction of the autonomous vehicle 2 based on yaw rate information from the yaw rate sensor.

The remote assistance request determination portion 34 determines whether remote assistance should be requested to the remote operator R or not. The remote assistance request determination portion 34 determines whether remote assistance should be requested or not, based on the vehicle positional information on the autonomous vehicle 2, acquired by the vehicle position acquisition portion 31, and the map information in the map database 24, or the external environment recognized by the external environment recognition portion 32.

When the autonomous vehicle 2 enters a predetermined situation where remote assistance should be requested, the remote assistance request determination portion 34 determines that remote assistance should be requested. The situation where remote assistance should be requested includes at least one of the following situations: a situation where lane deviation avoidance from an obstacle ahead of the autonomous vehicle 2 is required; a situation where the autonomous vehicle 2 turns right at an intersection; a situation where the autonomous vehicle 2 enters an intersection with a traffic light or without a traffic light; a situation where the autonomous vehicle 2 passes a traffic light (e.g., a situation where the autonomous vehicle 2 passes a traffic light for a zebra zone in the middle of a road); a situation where the autonomous vehicle 2 starts to change lanes; a situation where the autonomous vehicle 2 enters a construction zone; and a situation where the autonomous vehicle 2 enters a railroad crossing.

Note that the autonomous vehicle 2 may not necessarily determine that remote assistance should be requested at the time when the autonomous vehicle 2 turns right at an intersection. Under a given condition (e.g., no oncoming vehicle is detected), the autonomous vehicle 2 may automatically turn right at the intersection without making a remote assistance request.

When the remote assistance request determination portion 34 determines that remote assistance should be requested, the remote assistance request determination portion 34 transmits a remote assistance request to the vehicle remote assistance server 10. The remote assistance request determination portion 34 transmits identification information on the autonomous vehicle 2, the vehicle positional information, and the external environment information to the vehicle remote assistance server 10 together with the remote assistance request. The remote assistance request determination portion 34 may transmit, to the vehicle remote assistance server 10, a type of situation determined to require remote assistance. The type of situation determined to require remote assistance is the situation of lane deviation avoidance from an obstacle ahead of the autonomous vehicle 2, the situation of right turn at an intersection, the situation of entry to a construction zone, or the like.

Further, the remote assistance request determination portion 34 may further transmit traveling state information (information on the vehicle speed, the yaw rate, or the like) on the autonomous vehicle 2 to the vehicle remote assistance server 10. The remote assistance request determination portion 34 may also transmit, to the vehicle remote assistance server 10, related information including at least one of a destination of the autonomous vehicle 2, the number of occupants, a vehicle type, and a fuel remaining amount.

The trajectory generation portion 35 generates a trajectory used in autonomous-driving of the autonomous vehicle 2. The trajectory generation portion 35 generates a trajectory for autonomous-driving based on a predetermined travel route, the map information, the positional information on the autonomous vehicle 2, the external environment around the autonomous vehicle 2, and the traveling state of the autonomous vehicle 2.

The travel route is a route along which the autonomous vehicle 2 travels during autonomous-driving. The trajectory generation portion 35 finds a travel route for autonomous-driving based on the destination, the map information, and the positional information on the autonomous vehicle 2, for example. The travel route may be set by a well-known navigation system. The destination may be set by an occupant of the autonomous vehicle 2 or may be automatically proposed by the autonomous-driving ECU 20, the navigation system, or the like.

The trajectory includes a path along which a vehicle travels in autonomous-driving and a vehicle speed profile in autonomous-driving. The path is a course where the vehicle during autonomous-driving is to travel on the travel route. The path can be data (a steering angle profile) of steering angle changes of the autonomous vehicle 2 that correspond to positions on the travel route, for example. The positions on the travel route are set vertical positions set at predetermined intervals (e.g., 1 m) in the advancing direction on the travel route, for example. The steering angle profile is data in which a target steering angle is associated with each set vertical position.

The trajectory generation portion 35 generates a path where the autonomous vehicle 2 is to travel, based on the travel route, the map information, the external environment around the autonomous vehicle 2, and the traveling state of the autonomous vehicle 2, for example. The trajectory generation portion 35 generates the path so that the autonomous vehicle 2 goes through the center of a lane (the center in the lane-width direction) included in the travel route, for example.

The vehicle speed profile is data in which a target vehicle speed is associated with each set vertical position, for example. Note that the set vertical position may be set on the basis of a travel time of the autonomous vehicle 2, instead of distance. The set vertical position may be set as an arrival position of the vehicle after one second or as an arrival position of the vehicle after two seconds.

The trajectory generation portion 35 generates the vehicle speed profile based on the path and traffic rule information such as regulation speeds included in the map information, for example. Instead of the regulation speeds, predetermined setting speeds for positions or zones on the map may be used. The trajectory generation portion 35 generates a trajectory for autonomous-driving from the path and the vehicle speed profile. Note that the generation method for generating a trajectory by the trajectory generation portion 35 is not limited to what is described above and can employ well-known techniques related to autonomous-driving. This also applies to the content of the trajectory.

When remote assistance is requested to the vehicle remote assistance server 10 from the remote assistance request determination portion 34, the trajectory generation portion 35 generates a trajectory suitable for the remote assistance in advance. Options for a remote assistance content are determined in advance in accordance with a situation of the autonomous vehicle 2. For example, options for a remote assistance content at the time of right turn at an intersection include a suggestion to start turning right (advance) and a suggestion to stand by. The options for the remote assistance content at the time of right turn at an intersection may include a suggestion to go straight instead of turning right or a suggestion of urgent evacuation. Note that the trajectory generation portion 35 may not necessarily generate a trajectory in advance and may generate a trajectory corresponding to a remote assistance content after the trajectory generation portion 35 receives the remote assistance content.

The autonomous-driving controlling portion 36 performs autonomous-driving on the autonomous vehicle 2. The autonomous-driving controlling portion 36 performs autonomous-driving on the autonomous vehicle 2 based on the external environment around the autonomous vehicle 2, the traveling state of the autonomous vehicle 2, and the trajectory generated by the trajectory generation portion 35, for example. The autonomous-driving controlling portion 36 performs autonomous-driving on the autonomous vehicle 2 by transmitting a control signal to the actuator 26.

When remote assistance is requested to the vehicle remote assistance server 10 from the remote assistance request determination portion 34, the autonomous-driving controlling portion 36 waits for a remote assistance content to be transmitted from the vehicle remote assistance server 10. In a case where an occupant having a driver's license sits on a driver seat, when the autonomous-driving controlling portion 36 does not receive the remote assistance content even after a predetermined stand-by time, the autonomous-driving controlling portion 36 may request the occupant to determine traveling or to manually drive the autonomous vehicle 2. In a case where the autonomous-driving controlling portion 36 does not receive the remote assistance content even after a predetermined stand-by time and the determination by the occupant or the manual driving by the occupant is difficult, the autonomous-driving controlling portion 36 may automatically perform urgent evacuation.

Even when the autonomous-driving controlling portion 36 receives the remote assistance content from the vehicle remote assistance server 10, it is not necessary to follow the remote assistance content. Even in a case where the autonomous-driving controlling portion 36 receives a suggestion to advance the autonomous vehicle 2 as the remote assistance content, when the autonomous-driving controlling portion 36 detects sudden approach of a pedestrian or the like, the autonomous-driving controlling portion 36 may stop the autonomous vehicle 2 preferentially. The autonomous-driving controlling portion 36 may retransmit the remote assistance request from the remote assistance request determination portion 34 depending on a change of the situation.

Configuration of Vehicle Remote Assistance System

As illustrated in FIG. 1, the vehicle remote assistance system 1 includes the operator interface 3, a remote assistance example database 4, and the vehicle remote assistance server 10.

The operator interface 3 is an interface to be used when the remote operator R performs remote assistance on the autonomous vehicle 2. An output portion and an assistance content input portion are provided in the operator interface 3. The output portion is a device configured to output various pieces of information about an autonomous vehicle targeted for remote assistance. The output portion includes a display configured to output image information and a speaker configured to output sound information.

The assistance content input portion is a device into which a remote assistance content is input by the remote operator R. The assistance content input portion includes an input lever, for example, and transmits (notifies), to the autonomous vehicle 2, a suggestion to advance or stop the autonomous vehicle, or the like, as the remote assistance content by operation of the input lever. The assistance content input portion may include a keyboard, a mouse, and a touch panel and may have a function of sound recognition or gesture recognition. The assistance content input portion may include an operation pedal to be operated by foot.

The remote assistance example database 4 is a database in which examples of past remote assistance are stored. In the remote assistance example database 4, a past assistance request situation is stored as a previous remote assistance request situation of the autonomous vehicle. The remote assistance request situation is a situation in which the autonomous vehicle 2 has made a remote assistance request to the remote operator R. The remote assistance request situation includes vehicle positional information and external environment information on the autonomous vehicle 2.

In the remote assistance example database 4, the past assistance request situation including vehicle positional information and external environment information on the autonomous vehicle 2 at the time when the autonomous vehicle 2 has made a remote assistance request previously is stored. The external environment information may include a camera captured image of an area ahead of the autonomous vehicle 2.

Further, in the remote assistance example database 4, the past assistance request situation and a remote assistance content made by the remote operator R in the past assistance request situation are stored in association with each other. In the remote assistance example database 4, the following situation is stored. That is, for example, in a past assistance request situation where a broken-down vehicle stopping out of a shoulder of a road over a driving lane is present ahead of the autonomous vehicle 2, lane deviation avoidance is suggested to the autonomous vehicle 2 as a remote assistance content made by the remote operator R. In the remote assistance example database 4, a travel locus of the autonomous vehicle 2 and a vehicle speed change in the lane deviation avoidance may be stored as the remote assistance content.

Figure 3:
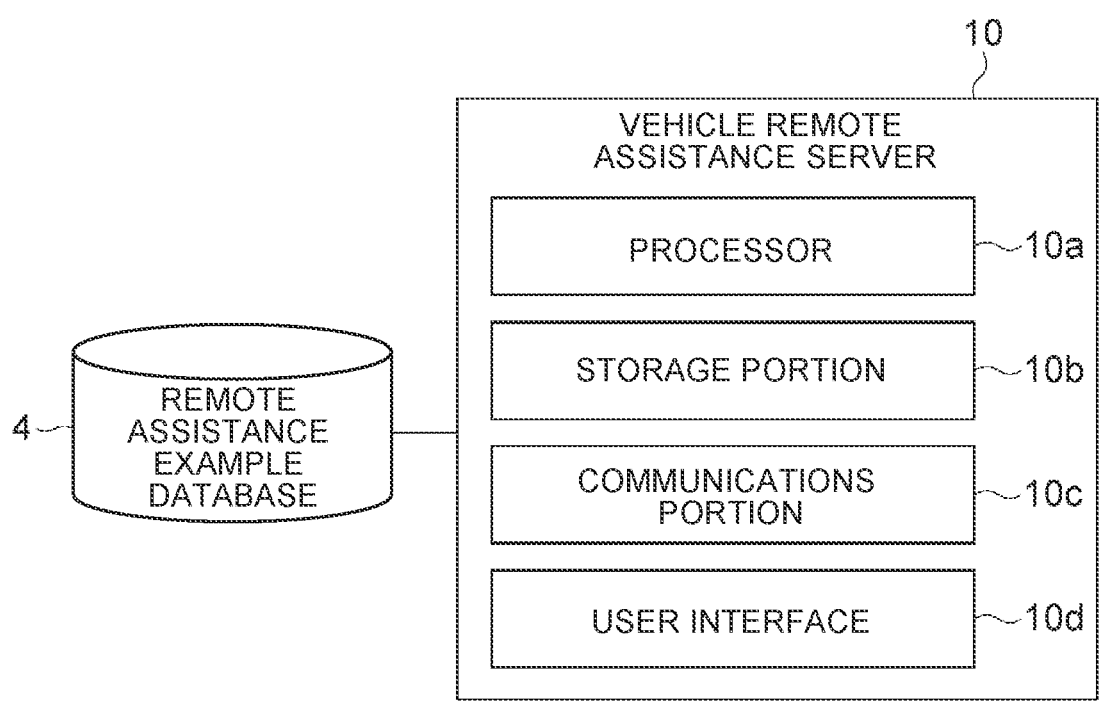
FIG. 3 is a block diagram illustrating an exemplary hardware configuration of a vehicle remote assistance server.

FIG. 3 is a block diagram illustrating an exemplary hardware configuration of the vehicle remote assistance server 10. As illustrated in FIG. 3, the vehicle remote assistance server 10 can be constituted as a general computer including a processor 10a, a storage portion 10b, a communications portion 10c, and a user interface 10d.

The processor 10a operates various operating systems and controls the vehicle remote assistance server 10. The processor 10a is a calculator such as a CPU including a control device, a computing device, a resistor, and so on. The processor 10a unifies the storage portion 10b, the communications portion 10c, and the user interface 10d. The storage portion 10b includes at least either one of a memory and a storage. The memory is a recording medium such as a ROM or a RAM. The storage is a recording medium such as a hard disk drive (HDD).

The communications portion 10c is a communications device configured to perform communication via the network N. As the communications portion 10c, a network device, a network controller, a network card, and the like can be used. The user interface 10d is an input-output portion of the vehicle remote assistance server 10 to a user such as an administrator. The user interface 10d includes an output device such as a display or a speaker, and an input device such as touch panel. Note that the vehicle remote assistance server 10 may not necessarily be provided in a facility and may be provided in a movable body such as a vehicle. The vehicle remote assistance server 10 may be constituted by a plurality of computers.

Figure 4:
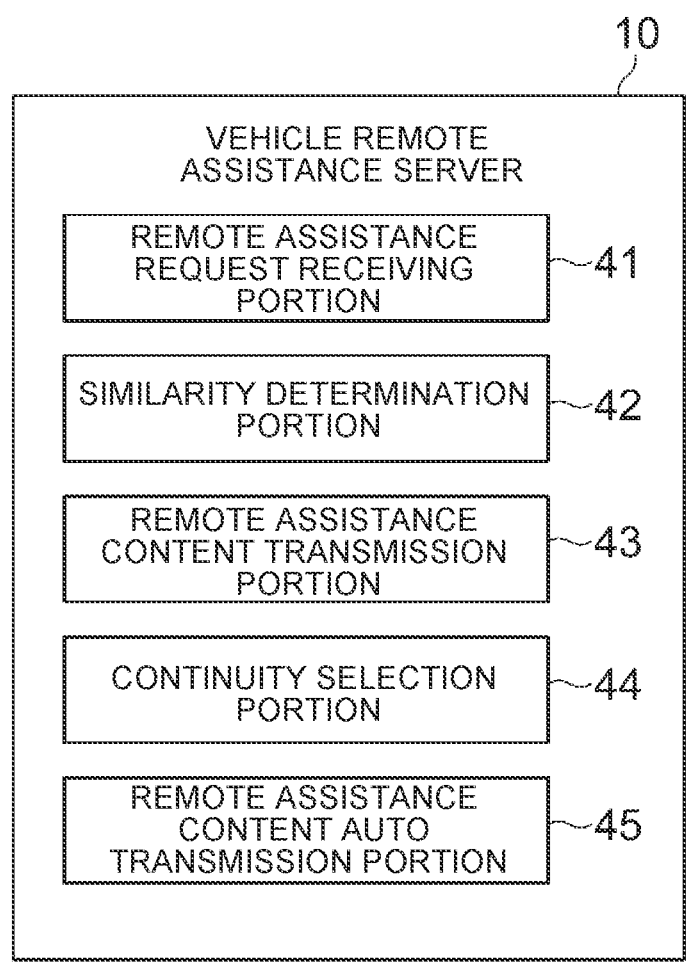
FIG. 4 is a block diagram illustrating an exemplary functional configuration of the vehicle remote assistance server.

Next will be described a functional configuration of the vehicle remote assistance server 10. FIG. 4 is a block diagram illustrating an exemplary functional configuration of the vehicle remote assistance server 10. The vehicle remote assistance server 10 illustrated in FIG. 4 includes a remote assistance request receiving portion 41, a similarity determination portion 42, a remote assistance content transmission portion 43, a continuity selection portion 44, and a remote assistance content auto transmission portion 45.

The remote assistance request receiving portion 41 receives a remote assistance request transmitted from the autonomous vehicle 2. Further, the remote assistance request receiving portion 41 acquires identification information, vehicle positional information, and external environment information on the autonomous vehicle 2 that has transmitted a remote assistance request. The vehicle positional information and the external environment information are included in a remote assistance request situation of the autonomous vehicle 2. The remote assistance request receiving portion 41 may acquire traveling state information on the autonomous vehicle 2 or may acquire related information including at least one of a destination, the number of occupants, a vehicle type, and a fuel remaining amount of the autonomous vehicle 2.

When the remote assistance request receiving portion 41 receives the remote assistance request transmitted from the autonomous vehicle 2, the similarity determination portion 42 determines whether the remote assistance request situation of the autonomous vehicle 2 is similar to a past assistance request situation stored in the remote assistance example database 4 or not, based on the vehicle positional information and the external environment information on the autonomous vehicle 2 that has transmitted the remote assistance request.

The similarity determination portion 42 performs similarity determination at two stages of the position and the external environment, for example. The similarity determination portion 42 determines whether or not there is a past assistance request situation the position of which is similar to that of the remote assistance request situation, based on the vehicle positional information included in the remote assistance request situation. When there is a past assistance request situation the position of which corresponds to a position within a distance threshold from the position of the vehicle positional information included in the remote assistance request situation, the similarity determination portion 42 determines that there is a past assistance request situation the position of which is similar to that of the remote assistance request situation. The distance threshold is not limited in particular. The distance threshold may be 1 m or may be 2 m. The distance threshold may be set in advance in accordance with sensor performance of the autonomous vehicle 2 or a vehicle type of the autonomous vehicle 2.

The similarity determination portion 42 may use different thresholds for the extending direction (vertical direction) of a road and the width direction (lateral direction) of the road in position similarity determination. The similarity determination portion 42 may set a lateral-direction threshold to a value smaller than that of a vertical-direction threshold. Even in a case where the remote assistance request situation is similar to the past assistance request situation, a position at which the autonomous vehicle 2 is determined to make a remote assistance request may change depending on sensor performance, a vehicle height, or the like. The vertical-direction threshold may be 10 m or may be 50 m. In terms of the lateral direction, it is conceivable to set the lateral-direction threshold such that similarity determination is not performed across the lane. The lateral-direction threshold can be a few meters. The values of the vertical-direction threshold and the lateral-direction threshold are not limited. The similarity determination portion 42 may use machine learning for the position similarity determination.

Note that the similarity determination portion 42 may narrow the range of past assistance request situations to be compared in the remote assistance example database 4 in consideration of a type of situation (a type such as lane deviation avoidance from an obstacle or entry to a construction zone) based on which remote assistance is determined to be requested. Further, a time limit may be set for a past assistance request situation to be used for the similarity determination. The time limit can be changed in accordance with the type of situation based on which remote assistance is determined to be requested.

When the similarity determination portion 42 determines that there is a past assistance request situation the position of which is similar to that of the remote assistance request situation, the similarity determination portion 42 performs similarity determination on external environment based on external environment information of the remote assistance request situation and external environment information of the past assistance request situation.

The similarity determination portion 42 may perform similarity determination on external environment by making a comparison between forward camera captured images of the autonomous vehicle 2. When a forward camera captured image of the autonomous vehicle 2, included in the external environment information of the remote assistance request situation, is similar to a forward camera captured image included in the external environment information of the past assistance request situation, the similarity determination portion 42 determines that the external environment of the remote assistance request situation is similar to the external environment of the past assistance request situation, and hereby, the similarity determination portion 42 can determine that there is a past assistance request situation similar to the remote assistance request situation.

Well-known various techniques can be used for the image similarity determination. The similarity determination may be performed based on a pixel unit. Note that the similarity determination may be performed by making a comparison between obstacle images instead of making a comparison between whole images. In this case, an obstacle image may be extracted by narrowing by image recognition, or an obstacle image may be extracted by use of a detection result from the millimeter wave radar or the LIDAR. Further, in the image similarity determination, preprocessing such as viewpoint conversion may be performed in consideration of a camera mounting position on the autonomous vehicle 2.

Further, in the image similarity determination, matching using an image feature amount (Scale-Invariant Feature Transform or the like) and machine learning (Support Vector Machine or the like) may be used, or matching using deep learning (Convolutional Neural Network or the like) may be performed. In a case where another vehicle is included in the image, the similarity determination may be performed by use of display or the like of a vehicle type, a position, color, and a number plate of another vehicle. The similarity determination may be performed based on positions and magnitudes of targets such as a road-sign, a signboard, and a pylon in the image.

In a case where the remote assistance request is made due to an obstacle, the similarity determination portion 42 may perform similarity determination on external environment on the basis of the obstacle ahead of the autonomous vehicle 2. The similarity determination portion 42 recognizes a position of the obstacle on the map, based on the external environment information (information on a relative position between the autonomous vehicle 2 and the obstacle) and the vehicle positional information of the remote assistance request situation. The similarity determination portion 42 may recognize a shape of the obstacle based on the external environment information of the remote assistance request situation. The similarity determination portion 42 may further recognize a magnitude and a type (a type such as a four-wheel car, a two-wheeler, or a falling object) of the obstacle. Information on the obstacle may be acquired from a camera captured image, may be acquired from the millimeter wave radar or the LIDAR, or may be acquired by using various sensors compositely. The magnitude, the shape, and the position of the obstacle can be acquired as a detection-point group detected by the millimeter wave radar or the LIDAR. The obstacle may be limited to a stationary object.

When the position and the shape of the recognized obstacle are similar to the position and the shape of an obstacle included in the external environment information of the past assistance request situation, the similarity determination portion 42 determines that the external environment of the remote assistance request situation is similar to the external environment of the past assistance request situation, and thus, the similarity determination portion 42 determines that there is a past assistance request situation similar to the remote assistance request situation.

Note that the position of the obstacle may not necessarily be exactly the same as that in the past assistance request situation. When the position of the obstacle is within a predetermined obstacle determination distance, it can be determined that the position of the obstacle is similar to that in the past assistance request situation. The obstacle determination distance is not limited in particular. The obstacle determination distance may be 1 m or may be 2 m. The shape of the obstacle may not need to be exactly the same as that in the past assistance request situation, and an error within a given range is allowable. The similarity determination portion 42 may perform similarity determination by use of the magnitude or the type of the obstacle instead of the shape of the obstacle or may perform similarity determination by use of only the position of the obstacle. In a case where the type of the obstacle is used, similarity can be determined only when the type of the obstacle is exactly the same as that in the past assistance request situation.

Well-known various techniques can be used for the similarity determination using the obstacle. The similarity determination may be performed by machine learning. The obstacle may include surrounding objects as well as an object ahead of the vehicle. The objects may include another vehicle, a pedestrian, a bicycle, and so on.

The remote assistance content transmission portion 43 transmits a remote assistance content made by the remote operator R to the autonomous vehicle 2. When the similarity determination portion 42 determines that there is no past assistance request situation similar to the remote assistance request situation, the remote assistance content transmission portion 43 requests the remote operator R to input a remote assistance content, so that the remote operator R inputs a remote assistance content into the operator interface 3. When the remote operator R inputs the remote assistance content into the operator interface 3, the remote assistance content transmission portion 43 transmits the remote assistance content to the autonomous vehicle 2.

Figure 5A:
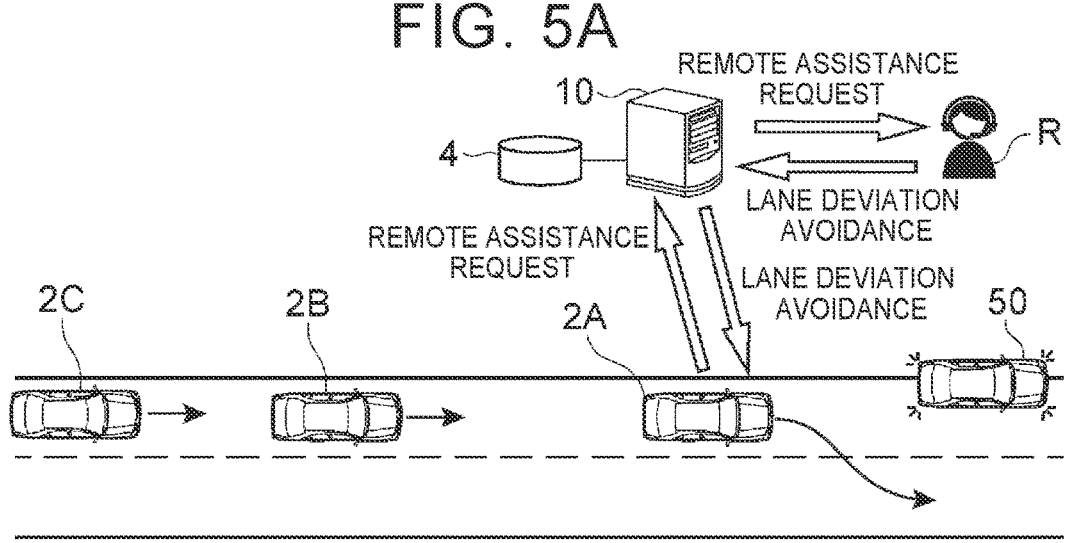
FIG. 5A is a view illustrating an example of a scene where remote assistance is performed by a remote operator.

Here, FIG. 5A is a view illustrating an example of a scene where remote assistance is performed by the remote operator. FIG. 5A illustrates autonomous vehicles 2A, 2B, 2C and a broken-down vehicle 50. The autonomous vehicles 2A, 2B, 2C communicate with the vehicle remote assistance server 10. The autonomous vehicles 2A, 2B, 2C travel on the same lane in order of the autonomous vehicle 2A, the autonomous vehicle 2B, and the autonomous vehicle 2C. The broken-down vehicle 50 stops on the shoulder of the road over the lane where the autonomous vehicles 2A, 2B, 2C travel. In order to advance by avoiding the broken-down vehicle 50, lane deviation avoidance to deviate from the lane is necessary.

In the situation illustrated in FIG. 5A, the autonomous vehicle 2A determines that lane deviation avoidance is required due to the presence of the broken-down vehicle 50 and remote assistance should be requested, and then, the autonomous vehicle 2A makes a remote assistance request to the vehicle remote assistance server 10. The autonomous vehicle 2A also transmits vehicle positional information and external environment information (e.g., a camera captured image including the broken-down vehicle 50). The vehicle remote assistance server 10 informs the remote operator R of the remote assistance request. Here, it is assumed that there is no past assistance request situation similar to a remote assistance request situation of the autonomous vehicle 2A.

The remote operator R grasps the situation of the autonomous vehicle 2A and inputs a remote assistance content. Here, the remote operator R makes a suggestion of lane deviation avoidance as the remote assistance content. The vehicle remote assistance server 10 transmits the suggestion of lane deviation avoidance that is made by the remote operator R to the autonomous vehicle 2A. Upon receipt of the suggestion of lane deviation avoidance as the remote assistance content, the autonomous vehicle 2A performs lane deviation avoidance to avoid the broken-down vehicle 50. The vehicle remote assistance server 10 stores the remote assistance request situation and the remote assistance content in the remote assistance example database 4 in association with each other. Note that the vehicle remote assistance server 10 may store the remote assistance request situation and the remote assistance content in the remote assistance example database 4 after the continuity selection portion 44 causes the remote operator R to make a continuity selection (described later).

When the remote operator R inputs the remote assistance content, the continuity selection portion 44 causes the remote operator R to make a selection of whether the remote assistance request situation has continuity or not. The continuity selection portion 44 causes the remote operator R to make a continuity selection by image display and/or audio output through the operator interface 3. That the remote assistance request situation has continuity indicates, for example, a situation in which there is a different autonomous vehicle 2 following the autonomous vehicle 2 transmitting the remote assistance request this time, and the same remote assistance request situation continuously occurs for the different autonomous vehicle 2.

When the remote operator R determines that the remote assistance request situation has continuity as a result of the continuity selection, the continuity selection portion 44 stores the remote assistance request situation in the remote assistance example database 4 as a past assistance request situation. Note that all remote assistance request situations may be stored in the remote assistance example database 4 regardless of their results of the continuity selection. In this case, each of the past assistance request situations is stored in the remote assistance example database 4 in association with its result of the continuity selection made by the remote operator R.

When the similarity determination portion 42 determines that there is a past assistance request situation similar to the remote assistance request situation, the remote assistance content auto transmission portion 45 transmits a remote assistance content corresponding to the past assistance request situation to the autonomous vehicle 2 in substitution for the remote operator R. The remote assistance content auto transmission portion 45 refers to the remote assistance example database 4 and transmits, to the autonomous vehicle 2, the remote assistance content corresponding to the past assistance request situation determined to have similarity.

In a case where all remote assistance request situations are stored in the remote assistance example database 4 regardless of their results of the continuity selection, the remote assistance content auto transmission portion 45 can be configured such that, only when the remote assistance request situation of the autonomous vehicle 2 is determined to be similar to a past assistance request situation determined to have continuity as a result of the continuity selection, the remote assistance content auto transmission portion 45 transmits a remote assistance content corresponding to the past assistance request situation to the autonomous vehicle 2. In this case, when the remote assistance request situation of the autonomous vehicle 2 is determined to be similar to a past assistance request situation determined not to have continuity as a result of the continuity selection, the remote assistance content auto transmission portion 45 does not transmit a remote assistance content corresponding to the past assistance request situation to the autonomous vehicle 2.

Figure 5B:
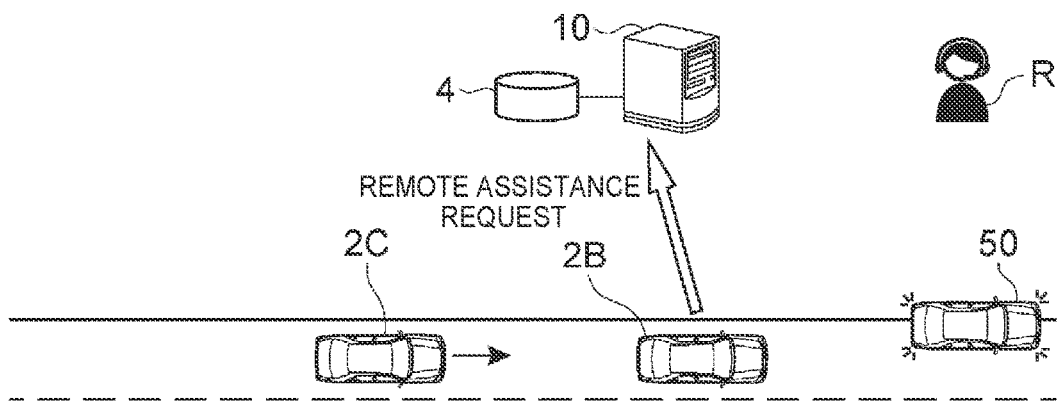
FIG. 5B is a view illustrating an example of a case where there is a past assistance request situation the position of which is similar to that of a remote assistance request situation of the autonomous vehicle.

Here, FIG. 5B is a view illustrating an example of a case where there is a past assistance request situation the position of which is similar to that of a remote assistance request situation of the autonomous vehicle 2B. FIG. 5B comes next to the scene of FIG. 5A. In FIG. 5B, subsequently to the autonomous vehicle 2A that has advanced by avoiding the broken-down vehicle 50 by performing lane deviation avoidance in accordance with the remote assistance made by the remote operator R, the autonomous vehicle 2B following the autonomous vehicle 2A makes a remote assistance request. The autonomous vehicle 2B also makes the remote assistance request due to the broken-down vehicle 50. The autonomous vehicle 2B transmits vehicle positional information and external environment information to the vehicle remote assistance server 10.

Based on the vehicle positional information on the autonomous vehicle 2B that has made the remote assistance request, the similarity determination portion 42 of the vehicle remote assistance server 10 determines that there is a past assistance request situation (the remote assistance request situation of the autonomous vehicle 2A) the position of which is similar to that of the remote assistance request situation of the autonomous vehicle 2B in the remote assistance example database 4.

Figure 5C:
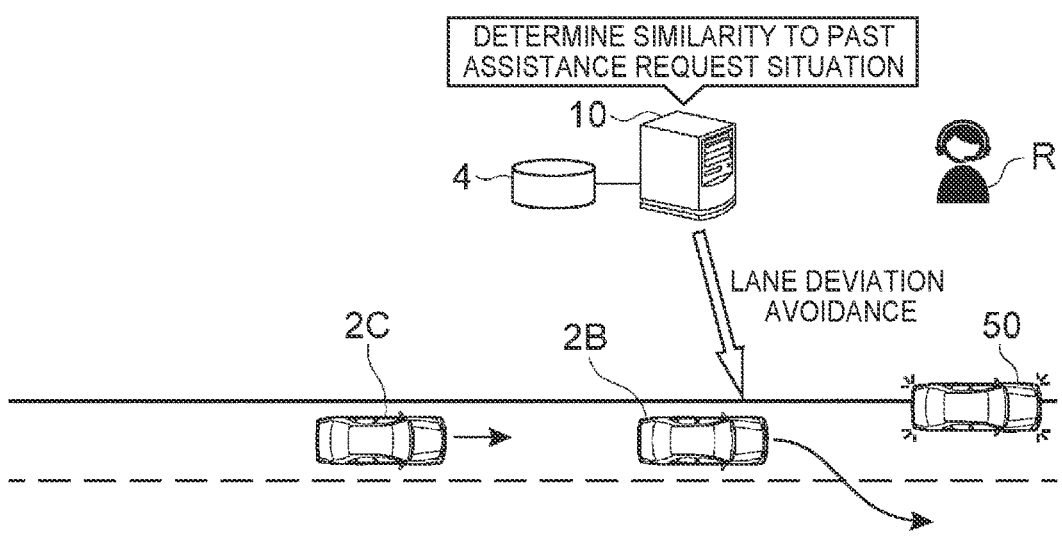
FIG. 5C is a view illustrating an example of a scene where a remote assistance content corresponding to the past assistance request situation is transmitted to the autonomous vehicle.

FIG. 5C is a view illustrating an example of a scene where a remote assistance content corresponding to the past assistance request situation is transmitted to the autonomous vehicle. In FIG. 5C, the similarity determination portion 42 of the vehicle remote assistance server 10 performs similarity determination on external environment based on the external environment information transmitted from the autonomous vehicle 2B and the external environment information included in the past assistance request situation of the autonomous vehicle 2A.

For example, when a camera captured image, of the autonomous vehicle 2B, that includes the broken-down vehicle 50 is similar to a camera captured image, in the past assistance request situation of the autonomous vehicle 2A, that includes the broken-down vehicle 50, the similarity determination portion 42 determines that the remote assistance request situation of the autonomous vehicle 2B is similar to the past assistance request situation of the autonomous vehicle 2A in external environment as well as position. Based on this, the similarity determination portion 42 determines that there is a past assistance request situation similar to the remote assistance request situation. In substitution for the remote operator R, the remote assistance content auto transmission portion 45 transmits a suggestion of lane deviation avoidance to the autonomous vehicle 2B as a remote assistance content corresponding to the past assistance request situation of the autonomous vehicle 2A. Upon receipt of the suggestion of lane deviation avoidance as the remote assistance content, the autonomous vehicle 2B performs lane deviation avoidance to avoid the broken-down vehicle 50.

Vehicle Remote Assistance Method in Vehicle Remote Assistance System

Figure 6:
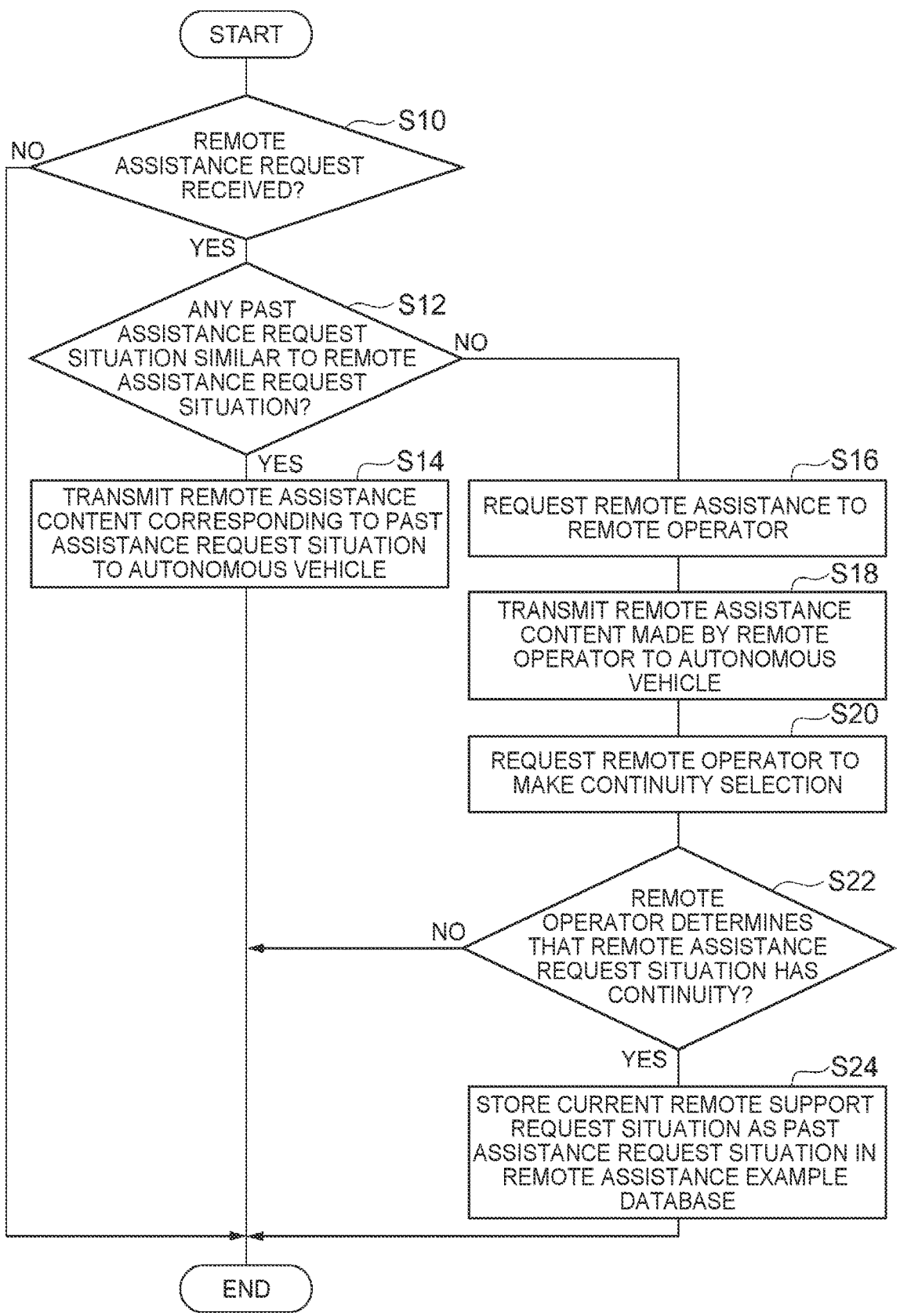
FIG. 6 is a flowchart illustrating an example of a vehicle remote assistance process in the vehicle remote assistance system.

Next will be described a vehicle remote assistance method (process) of a vehicle remote assistance system 1 according to the present embodiment with reference to FIG. 6. FIG. 6 is a flowchart illustrating an example of the vehicle remote assistance process in the vehicle remote assistance system.

As illustrated in FIG. 6, in S10, the vehicle remote assistance server 10 of the vehicle remote assistance system 1 determines whether or not the remote assistance request receiving portion 41 receives a remote assistance request from the autonomous vehicle 2 (a remote assistance request reception determination step). When the vehicle remote assistance server 10 determines that the remote assistance request receiving portion 41 receives the remote assistance request from the autonomous vehicle 2 (S10: YES), the vehicle remote assistance server 10 proceeds to S12. When the vehicle remote assistance server 10 determines that the remote assistance request receiving portion 41 does not receive the remote assistance request from the autonomous vehicle 2 (S10: NO), the process at this time is ended. After that, the vehicle remote assistance server 10 repeats the process of S10 again after a given period of time has elapsed.

In S12, the vehicle remote assistance server 10 causes the similarity determination portion 42 to determine whether or not there is a past assistance request situation similar to a remote assistance request situation (a similarity determination step). The similarity determination portion 42 performs similarity determination at two stages of position and external environment, for example. When there is a past assistance request situation the position of which is similar to that of the remote assistance request situation, and the external environment of the past assistance request situation is also similar to that of the remote assistance request situation, the similarity determination portion 42 determines that there is a past assistance request situation the position of which is similar to that of the remote assistance request situation. When the similarity determination portion 42 determines that there is a past assistance request situation the position of which is similar to that of the remote assistance request situation (S12: YES), the vehicle remote assistance server 10 proceeds to S14. When the similarity determination portion 42 determines that there is no past assistance request situation the position of which is similar to that of the remote assistance request situation (S12: NO), the vehicle remote assistance server 10 proceeds to S16.

In S14, the vehicle remote assistance server 10 causes the remote assistance content auto transmission portion 45 to transmit a remote assistance content corresponding to the past assistance request situation (the past assistance request situation determined to have similarity) to the autonomous vehicle 2 (a remote assistance content auto transmission step). After that, the vehicle remote assistance server 10 ends the process this time. The vehicle remote assistance server 10 repeats the process of S10 again after a given period of time has elapsed.

In S16, the vehicle remote assistance server 10 requests remote assistance to the remote operator R (a remote assistance request step). The vehicle remote assistance server 10 requests the remote operator R to input a remote assistance content through the operator interface 3. The vehicle remote assistance server 10 displays a situation of the autonomous vehicle 2 on the operator interface 3.

In S18, the vehicle remote assistance server 10 causes the remote assistance content transmission portion 43 to transmit the remote assistance content input by the remote operator R to the autonomous vehicle 2.

In S20, in the vehicle remote assistance server 10, the continuity selection portion 44 causes the remote operator R to make a selection of whether the remote assistance request situation has continuity or not (a continuity selection step). The continuity selection portion 44 causes the remote operator R to make a continuity selection by image display and/or audio output through the operator interface 3. Note that the order of S20 and S18 may be reversed to the above.

In S22, the vehicle remote assistance server 10 causes the continuity selection portion 44 to determine whether or not the remote operator R determines that the remote assistance request situation has continuity (a continuity determination step). When the remote operator R determines that the remote assistance request situation has continuity as a result of the continuity selection (S22: YES), the vehicle remote assistance server 10 proceeds to S24. When the remote operator R determines that the remote assistance request situation does not have continuity as a result of the continuity selection (S22: NO), the vehicle remote assistance server 10 ends the process this time. After that, the vehicle remote assistance server 10 repeats the process of S10 again after a given period of time has elapsed.

In S24, the vehicle remote assistance server 10 causes the continuity selection portion 44 to store the current remote assistance request situation in the remote assistance example database 4 as a past assistance request situation (a past assistance request situation storage step). In the remote assistance example database 4, the past assistance request situation including vehicle positional information and external environment information is stored in association with the remote assistance content. After that, the vehicle remote assistance server 10 ends the process this time and repeats the process of S10 again after a given period of time has elapsed.

In the vehicle remote assistance system 1 according to the present embodiment described above, when the remote assistance request situation of the autonomous vehicle 2 that has made a remote assistance request is determined to be similar to a past assistance request situation stored in the remote assistance example database, a remote assistance content corresponding to the past assistance request situation is transmitted to the autonomous vehicle 2 in substitution for the remote operator R. Accordingly, it is possible to reduce the frequency of remote assistance performed by the remote operator R, thereby making it possible to reduce a workload of the remote operator R.

Further, in the vehicle remote assistance system 1, the remote operator R is caused to make a selection of whether the remote assistance request situation of the autonomous vehicle 2 has continuity or not. When the remote assistance request situation of the autonomous vehicle 2 is determined to be similar to a past assistance request situation determined not to have continuity (e.g., a bicycle falls down on a zebra zone) as a result of the continuity selection, a remote assistance content corresponding to the past assistance request situation is not transmitted to the autonomous vehicle 2. Accordingly, it is possible to avoid wrongly transmitting, to the autonomous vehicle 2, a remote assistance content corresponding to a past assistance request situation which does not have continuity and which is highly likely to change.

In the vehicle remote assistance system 1, the situation of lane deviation avoidance from an obstacle ahead of a vehicle is included in the remote assistance request situation. Accordingly, in a situation to perform lane deviation avoidance to avoid an obstacle (e.g., a vehicle parking over a traveling path, a fallen object, or the like) by deviating from a lane to take a distance from the obstacle, it is possible to reduce the frequency of remote assistance performed by the remote operator R, thereby making it possible to reduce a workload of the remote operator R.

The embodiment of the present disclosure has been described above, but the present disclosure is not limited to the above embodiment. The present disclosure can be performed in various forms including various alterations and modifications made based on the knowledge of a person skilled in the art, in addition to the above embodiment.

The remote assistance may include remote operation performed by the remote operator R. The remote operation can achieve remote driving operation on the autonomous vehicle 2 such that the remote operator R operates a steering wheel, an accelerator pedal, a brake pedal, and so on provided in a facility outside the autonomous vehicle 2.

The remote assistance example database 4 may be part of the vehicle remote assistance server 10 or may be provided differently from the vehicle remote assistance server 10. The continuity selection portion 44 may not necessarily cause the remote operator R to make a continuity selection, and the continuity selection may be automatically made based on external environment information. The continuity selection portion 44 may automatically select, by machine learning, whether a remote assistance request situation has continuity or not, based on external environment information of the remote assistance request situation.

The vehicle remote assistance server 10 may not necessarily include the continuity selection portion 44. In this case, the similarity determination portion 42 may target all past assistance request situations for the similarity determination. Alternatively, the similarity determination portion 42 may narrow the range of past assistance request situations targeted for the similarity determination, by use of types of situation in which remote assistance is determined to be requested.

The method of the similarity determination to be performed by the similarity determination portion 42 is not limited in particular. The similarity determination portion 42 may not necessarily perform the similarity determination at two stages of position and external environment and may finish the similarity determination one time by use of vehicle positional information and external environment information. The remote assistance request situation may not necessarily include the situation of lane deviation avoidance from an obstacle ahead of a vehicle.

What is claimed is:

1. A vehicle remote assistance system in which a remote operator performs remote assistance on traveling of an autonomous vehicle upon receipt of a remote assistance request from the autonomous vehicle, the vehicle remote assistance system comprising:

a remote assistance example database in which a past assistance request situation and a remote assistance content are stored in association with each other, the past assistance request situation including vehicle positional information and external environment information at a time when the remote assistance request has been made previously, the remote assistance content being made by the remote operator in the past assistance request situation; and a server configured to, upon receipt of the remote assistance request from the autonomous vehicle, determine whether or not a remote assistance request situation of the autonomous vehicle is similar to the past assistance request situation stored in the remote assistance example database, based on a position of the autonomous vehicle transmitting the remote assistance request and an external environment around the autonomous vehicle, and when the server determines that the remote assistance request situation is similar to the past assistance request situation, transmit the remote assistance content corresponding to the past assistance request situation to the autonomous vehicle in substitution for the remote operator.

2. The vehicle remote assistance system according to claim 1, wherein the server is configured to, when the remote operator performs the remote assistance on the autonomous vehicle, cause the remote operator to make a selection of whether the remote assistance request situation of the autonomous vehicle has continuity or not;

the past assistance request situation is stored in the remote assistance example database in association with a result of the selection made by the remote operator;

when the remote assistance request situation of the autonomous vehicle is determined to be similar to the past assistance request situation determined to have continuity as the result of the selection, the server transmits, to the autonomous vehicle, the remote assistance content corresponding to the past assistance request situation; and when the remote assistance request situation of the autonomous vehicle is determined to be similar to the past assistance request situation determined not to have continuity as the result of the selection, the server does not transmit, to the autonomous vehicle, the remote assistance content corresponding to the past assistance request situation.

3. The vehicle remote assistance system according to claim 1, wherein the remote assistance request situation is a situation of lane deviation avoidance from an obstacle ahead of the autonomous vehicle.

4. A vehicle remote assistance server for a remote operator to perform remote assistance on traveling of an autonomous vehicle upon receipt of a remote assistance request from the autonomous vehicle, the vehicle remote assistance server comprising:

a similarity determination portion configured to, upon receipt of the remote assistance request from the autonomous vehicle, determine whether or not a remote assistance request situation of the autonomous vehicle is similar to a past assistance request situation, based on a position of the autonomous vehicle transmitting the remote assistance request and an external environment around the autonomous vehicle, the past assistance request situation including vehicle positional information and external environment information at a time when the remote assistance request has been made previously; and a remote assistance content auto transmission portion configured to, when the similarity determination portion determines that the remote assistance request situation is similar to the past assistance request situation, transmit a remote assistance content corresponding to the past assistance request situation to the autonomous vehicle in substitution for the remote operator, by referring to a remote assistance example database in which the past assistance request situation and the remote assistance content are stored in association with each other, the remote assistance content being made by the remote operator in the past assistance request situation.

5. The vehicle remote assistance server according to claim 4, further comprising:

a continuity selection portion configured to, when the remote operator performs the remote assistance on the autonomous vehicle, cause the remote operator to make a selection of whether the remote assistance request situation of the autonomous vehicle has continuity or not, wherein the past assistance request situation is stored in the remote assistance example database in association with a result of the selection made by the remote operator in the continuity selection portion;

when the remote assistance request situation of the autonomous vehicle is determined to be similar to the past assistance request situation determined to have continuity as the result of the selection, the remote assistance content auto transmission portion transmits, to the autonomous vehicle, the remote assistance content corresponding to the past assistance request situation; and when the remote assistance request situation of the autonomous vehicle is determined to be similar to the past assistance request situation determined not to have continuity as the result of the selection, the remote assistance content auto transmission portion does not transmit, to the autonomous vehicle, the remote assistance content corresponding to the past assistance request situation.

6. The vehicle remote assistance server according to claim 4, wherein the remote assistance request situation is a situation of lane deviation avoidance from an obstacle ahead of the autonomous vehicle.

7. A vehicle remote assistance method for a vehicle remote assistance system in which a remote operator performs remote assistance on traveling of an autonomous vehicle upon receipt of a remote assistance request from the autonomous vehicle, the vehicle remote assistance method comprising:

upon receipt of the remote assistance request from the autonomous vehicle, determining whether or not a remote assistance request situation of the autonomous vehicle is similar to a past assistance request situation, based on a position of the autonomous vehicle transmitting the remote assistance request and an external environment around the autonomous vehicle, the past assistance request situation including vehicle positional information and external environment information at a time when the remote assistance request has been made previously; and when the remote assistance request situation is determined to be similar to the past assistance request situation, transmitting a remote assistance content corresponding to the past assistance request situation to the autonomous vehicle in substitution for the remote operator, by referring to a remote assistance example database in which the past assistance request situation and the remote assistance content are stored in association with each other, the remote assistance content being made by the remote operator in the past assistance request situation.

8. The method according to claim 7, wherein the remote assistance request situation is a situation of lane deviation avoidance from an obstacle ahead of the autonomous vehicle.

\* \* \* \* \*